United States Patent Office 2,998,520
Patented Aug. 29, 1961

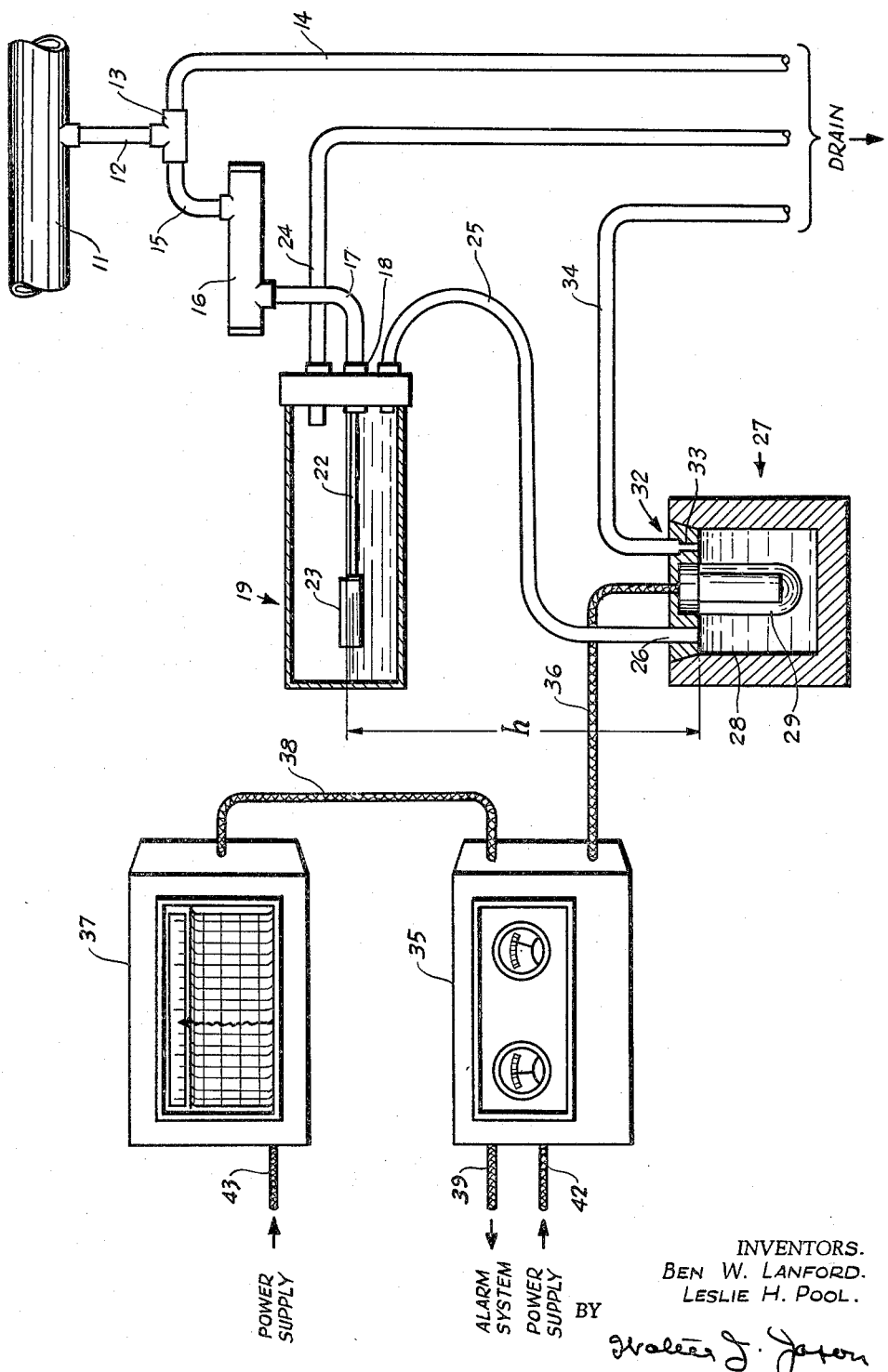

2,998,520
FLUID FLOW REGULATOR
Ben W. Lanford and Leslie H. Pool, Fort Worth, Tex., assignors to General Dynamics Corporation, San Diego, Calif., a corporation of Delaware
Filed July 25, 1958, Ser. No. 751,011
3 Claims. (Cl. 250—83.3)

The present invention relates generaly to apparatus for monitoring the radioactivity of liquids, and more particularly relates to apparatus which can determine the radioactivity per unit volume of the liquid being monitored.

Prior radiation monitoring devices which attempt to accurately determine the amount of radioactivity in liquids are subject to large errors due to the fact that the quantity of radiation measured per unit of time is measured without regard for the quantity of liquid in which the radiation is detected.

As a result, if a certain quantity of liquid passes through the detecting system in one minute, the amount of radiation detected in that period of time may be the same as that detected in the preceding one minute interval when a much greater, but less contaminated, quantity of liquid passed through the system.

This type of monitoring apparatus quite obviously cannot be used where the liquid pressure or flow may vary, for it could allow highly dangerous quantities of liquid to be detected as merely normally contaminated liquid. This precludes their use in almost all water supply systems, natural or man made water courses, sewage systems, and the like.

Another disadvantage of prior apparatus resides in the fact that although a thin walled glass detection tube is preferred to detect radiation in a liquid, high pressures or surges of pressure occurring in the liquid will often break or damage the detection tube.

The instant invention, however, is not subject to the inaccuracies or breakage of prior apparatus for it includes means for delivering a substantially constant flow of liquid to the radiation detector, regardless of external liquid pressures or flow rates.

Therefore, an object of the present invention is to provide apparatus of novel construction for accurately determining the amount of radioactivity per unit volume of a liquid.

Another object is to provide an improved form of radiation monitoring apparatus having means for delivering a substantially constant flow of liquid to the radiation detector element.

Another object is to provide apparatus for accurately measuring and recording the radioactivity per unit volume of liquid.

Other objects and features of the present invention will be readily apparent to those skilled in the art from the following specification and appended drawing wherein is illustrated a preferred form of the invention.

Referring to the drawing, an apparatus in accordance with the present invention is shown which can determine the radioactivity per unit volume of a liquid which is flowing through conduit 11. As part of this apparatus, a stem 12 is connected to conduit 11 in order to sample the liquid. A T joint 13 couples stem 12 to a by-pass line 14 and a filter line 15. The by-pass line 14 empties down a drain or other outlet, as indicated, but the filter line 15 carries liquid to a filter 16. A line 17 is fixed to the outlet of filter 16 and carries liquid from the filter to a valve 18 which is part of a flow regulator 19. Inside flow regulator 19 an arm 22 connects a float 23 to valve 18, and the position of the arm, or float, determines whether or not valve 18 admits liquid to the flow regulator, as will be more fully described. Connected to carry liquid from regulator 19 are an overflow line 24 which runs to a drain, and a pressure head line 25 which carries liquid to an inlet 26 of a housing 27. The housing contains a chamber 28 with a detection tube 29 for detecting radioactivity in the liquid which fills chamber 28. A chamber outlet 32 having a restricted portion 33 is located in the top of the housing and a drain line 34 is connected between this outlet and a drain as indicated.

The detection tube 29 is electrically connected to a meter 35 by leads 36, and the meter 35, in turn, is connected to a recorder 37 and an alarm system by leads 38 and 39 respectively. A power supply for the electrical equipment is connected to meter 35 and recorder 37 by leads 42 and 43 respectively, as shown in the drawing.

The above described apparatus can deliver a substantially constant flow of liquid to the detection element and accurately measure and record radiation detected thereby. The manner in which this is achieved can be more clearly understood from the following description of the operation of the apparatus.

A sample of liquid to be tested enters the stem 12 from the conduit 11, and a portion of this liquid flows into filter 16. The by-pass line 14 allows a continuous sampling of liquid in conduit 11 to take place so that the liquid entering filter 16 is representative of that which is presently flowing through conduit 11. The filter is conventional and is used to remove foreign matter or sediment which might clog or otherwise interfere with the proper operation of the remainder of the apparatus.

The liquid leaves filter 16 and is carried through line 17 to valve 18. This valve is of the conventional type which have an orifice that is closed or opened by the action of a float on the end of an arm. Thus, when float 23 is in a raised position due to a raised level of liquid in the flow regulator 19, the arm 22 is in such a position that the orifice which admits water is closed. As the liquid empties from the flow regulator through pressure head line 25 the level of liquid in 19 starts to drop, the float and arm begin to drop also, and the valve 18 is opened and admits liquid from line 17 until the float is raised again to a position which closes valve 18. It should be apparent that the action of the float and valve keeps the liquid in the flow regulator at a substantially constant level. This system is, of course, designed so that line 17 supplies a rate of flow into the regulator 19 which is greater than that which line 25 carries away from the regulator. Should valve 18 begin to leak as a result of wear and use, or should it inadvertently be jammed in an open position, the overflow line 24 will prevent the liquid level in the regulator from rising above the desired maximum level.

Under the action of gravity, the liquid in regulator 19 continually flows down line 25 to the inlet 26 of the housing 27. The vertical distance between the housing and the flow regulator is kept fixed at a constant value and, as a result, the vertical distance between the liquid level in regulator 19 and the chamber 28 remains substantially constant. This latter vertical distance is indicated in the drawing by the letter "$h$." Thus, a "head" of liquid of height "$h$" exists above chamber 28 and it produces a substantially constant inlet pressure at the chamber inlet 26. The restricted portion 33 of the chamber outlet 32 impedes the flow of liquid from the chamber into the drain line 34, and this restriction plus the constant head of liquid above the chamber result in a constant rate of flow through chamber 28. Surges or variations of liquid pressure that occur in conduit 11 have no effect on the constant rate of flow through chamber 28 and the detection tube 29 positioned therein is in no danger of being damaged by such pressure surges.

Perhaps of more importance, however, is the fact that with the liquid passing the detection tube at a constant rate of flow, the radiation detected by the tube in a set period of time always refers to the same amount of liquid. To prevent extraneous radioactivity from affecting the tube the housing 27 is made of conventional shielding material. Electrical connections are made to the tube through the top of the housing 27. The detection tube is one which is sensitive to gamma rays (high energy X-rays) and produces electrical signals when such radiation strikes it. There are various types of such radiation detection tubes which can be used for this purpose, the one used in the preferred embodiment being called a Geiger-Muller Counter Mark 1, Model 71, available from Radiation Counter Laboratories.

The electrical signals produced by the detection tube 29 are sent to the rate meter 35 which reads the signals in terms of gamma ray count rate and provides an indication of this reading. Such meters are conventional and commercially available, the preferred meter being called a Mark 10, Model 10A, Rate Meter sold by Radiation Counter Laboratories.

A continuous record of the meter readings is kept by the recorder 37 which receives electrical signals from meter 35 that are indicative of the gamma ray count rate. Recorders for this purpose are readily commercially available, one being the single record strip chart recorder of the type commercially available from Brown Instrument Division of Minneapolis-Honeywell Corporation.

In addition to keeping a continuous record of the radioactivity of the liquid being monitored, the apparatus is also used to set off an alarm system when excessive radiation is detected. The rate meter 35 sends an electrical signal to the alarm system through lead 39 when the meter reading exceeds a predetermined value. A "relay" is an electrical component commonly used to activate such alarm systems. The type of alarm system would, naturally, be dictated by considerations such as number of people to be alerted, the number and size of safety valves to be activated, the use made of the liquid being monitored, and many other parameters. Whatever the requirements, however, the rate meter 35 can be used to provide the electrical signal which activates the alarm system.

There has thus been described radiation monitoring apparatus which accurately determines and records the amount of radioactivity per unit volume of the liquid being monitored. And, while a certain preferred embodiment of the invention has been specifically disclosed, it should be understood that the invention is not limited thereto as many variations will be readily apparent to those skilled in the art and the invention is to be given its broadest possible interpretation within the terms of the following claims.

What we claim is:

1. Apparatus for detecting the radioactivity of a body of liquid flowing through a conduit, said apparatus comprising a radiation detection tube which emits electrical signals indicative of radiation incident thereon, electrical means connected to said detection tube for receiving said signals and providing an indication thereof, a housing enclosing said detection tube, said housing positioned below said conduit and having an inlet and outlet for liquid with said outlet including a restricted portion, a flow regulator having a float operated inlet valve and an outlet, said flow regulator being positioned below said conduit and above said housing with its outlet connected to said housing inlet and with its float operated inlet valve connected to receive liquid from said conduit whereby the rate of flow of liquid to said housing is independent of variations of liquid pressure in said conduit.

2. Apparatus for detecting the radioactivity of a body of liquid flowing through a conduit, said apparatus comprising a housing positioned below said conduit and having an inner chamber, said chamber having an inlet and outlet for liquid with said outlet including a flow restricting portion, a radiation detection tube within said chamber which emits electrical signals indicative of radiation incident thereon, electrical means connected to said detection tube for receiving said signals and providing an indication thereof, a flow regulator positioned below said conduit but above said housing and having an outlet connected to the inlet of said chamber, said flow regulator including an inlet valve connected to receive liquid from said conduit, said regulator containing a float and arm with said arm attached to said inlet valve, said arm controlling the opening and closing of said inlet valve in accordance with the vertical position of said float in said regulator so that the rate of flow of liquid to said detection tube is caused to be substantially constant and completely independent of the pressure of said liquid in said conduit.

3. Apparatus for detecting radioactivity in a body of liquid flowing through a conduit, said apparatus comprising a housing of radiation shielding material positioned below said conduit and including an inner shielded chamber adapted to hold liquid, said chamber having an inlet and outlet with said outlet including a liquid flow restricting portion, a radiation detection tube positioned within said chamber, a flow regulator positioned below said conduit but above said housing and having an outlet connected to the inlet of said housing chamber, said regulator including an inlet valve connected to a filter to receive liquid therefrom, said filter being connected to receive liquid from said conduit, said regulator containing a float and arm with said arm connected to said inlet valve, said arm controlling the opening and closing of said valve in accordance with the vertical position of said float and maintaining the liquid in said regulator at a substantially constant level as it continually flows from said regulator to said housing chamber.

References Cited in the file of this patent

UNITED STATES PATENTS

| | | |
|---|---|---|
| 2,367,949 | Langer | Jan. 23, 1949 |
| 2,641,710 | Pompeo et al. | June 9, 1953 |
| 2,736,812 | Weinstein et al. | Feb. 28, 1956 |
| 2,738,426 | Hurst | Mar. 13, 1956 |
| 2,744,199 | Juterbock et al. | May 1, 1956 |

OTHER REFERENCES

A Beta-Gamma Monitor For Liquid Streams, by Wingfield, A.E.C. Research and Development Report DP-177, September, 1956.